United States Patent
Lee et al.

(10) Patent No.: US 8,116,780 B2
(45) Date of Patent: Feb. 14, 2012

(54) DYNAMIC RESOURCE ALLOCATION METHOD BASED ON FREQUENCY REUSE PARTITIONING FOR OFMDA/FDD SYSTEM, AND FRAME TRANSMISSION METHOD THEREFOR

(75) Inventors: Hee-Soo Lee, Daejon (KR); Jae-Young Ahn, Daejon (KR); Kyung-Hi Chang, Seoul (KR); Joo Heo, Incheon (KR); In-Suk Cha, Incheon (KR)

(73) Assignees: Electronics and Telecommunications Research Institute, Daejeon (KR); Inha-Industry Partnership Institute, Incheon (KR)

( * ) Notice: Subject to any disclaimer, the term of this patent is extended or adjusted under 35 U.S.C. 154(b) by 884 days.

(21) Appl. No.: 12/063,933

(22) PCT Filed: Aug. 17, 2006

(86) PCT No.: PCT/KR2006/003223
§ 371 (c)(1),
(2), (4) Date: Feb. 15, 2008

(87) PCT Pub. No.: WO2007/021139
PCT Pub. Date: Feb. 22, 2007

(65) Prior Publication Data
US 2008/0232320 A1    Sep. 25, 2008

(30) Foreign Application Priority Data

Aug. 19, 2005  (KR) .................. 10-2005-0076466
Dec. 6, 2005   (KR) .................. 10-2005-0118386
Aug. 7, 2006   (KR) .................. 10-2006-0074359

(51) Int. Cl.
*H04W 72/00*    (2009.01)
(52) U.S. Cl. ............. 455/452.1; 455/450; 455/509; 455/453; 455/522; 455/512; 455/427; 455/561; 370/329; 370/350; 370/338; 370/252; 370/437; 370/330; 370/341; 370/320; 370/348; 370/254; 370/328; 370/345; 370/442

(58) Field of Classification Search ............... 455/452.1, 455/450, 453, 509, 522, 512, 427, 561; 370/329, 370/350, 338, 252, 437, 330, 341, 320, 348, 370/254, 328, 345, 442

See application file for complete search history.

(56) References Cited

U.S. PATENT DOCUMENTS 6,473,418 B1   10/2002  Laroia et al.
(Continued)

OTHER PUBLICATIONS

International Search Report for PCT/KR2006/003223 dated Oct. 26, 2006.

(Continued)

*Primary Examiner* — Kwasi Karikari
(74) *Attorney, Agent, or Firm* — Kile Park Goekjian Reed & McManus PLLC

(57) ABSTRACT

Provided are a dynamic resource allocation method based on frequency reuse partitioning for an Orthogonal Frequency Division Multiple Access (OFDMA) system, and a frame transmission method therefor. The dynamic resource allocation method includes: a) dividing a coverage into cells based on frequency reuse partitioning; b) selecting a candidate user to receive a channel allocated thereto based on the ratio; c) acquiring distance information for the candidate user; and d) checking whether the candidate user is in an inner or outer cell area based on the distance information. If the candidate user is in the inner cell area, a subchannel group among subchannel groups having a Frequency Reuse Factor (FRF) lower than a threshold value is selected and subcarriers of the selected subchannel group is allocated. If the candidate user is in the outer cell area, a subchannel group among subchannel groups having a FRF higher than the threshold value is selected.

4 Claims, 10 Drawing Sheets

U.S. PATENT DOCUMENTS

| | | | |
|---|---|---|---|
| 2001/0030956 A1* | 10/2001 | Chillariga et al. | 370/348 |
| 2001/0048691 A1* | 12/2001 | Chang et al. | 370/442 |
| 2002/0034158 A1 | 3/2002 | Wang et al. | |
| 2004/0162080 A1 | 8/2004 | Kostic et al. | |
| 2006/0014542 A1 | 1/2006 | Khandekar et al. | |
| 2006/0148411 A1 | 7/2006 | Cho et al. | |

OTHER PUBLICATIONS

Joo Heo et al., "A Novel Transmit Power Allocation Algorithm combined with Dynamic Channel Allocation in reuse Partitioning-based OFDMA/FDD System", IEEE International Conference on Communications Final Program; Istanbul, Jun. 11-15, 2006.

Cheong Yui et al., "Multiuser OFDM with Adaptive Subcarrier, Bit, and Power Allocation", IEEE Journal on Selected Areas in Communications, vol. 17, No. 10., Oct. 1999, pp. 1747-1758.

Boo-Sup Jung et al., "An Efficient Frequency Reuse Scheme for Cellular OFDM", Joint Conference on Communications & Information, 2004.

\* cited by examiner

| Parameter | Value | |
|---|---|---|
| Number of Subcarriers | 1024 | — 801 |
| Number of Effective Subcarriers | 768 | — 802 |
| Number of Pilot Subcarriers | 96 | — 803 |
| Sampling Frequency | 10 MHz | — 804 |
| Number of Subgroup | 32 | — 805 |
| Number of subcarriers per Subgroup | 27 | — 806 |
| Number of FRF 1 Subgroup | 16 | — 807 |
| Number of FRF 3 Subgroup | 16 | — 808 |

FIG. 11

| First Slot in Super Frame (L+W/D) | Other Slot (L+W/D) | Per Super Frame (L+W/D) | Information & Wasted Load Ratio per Sec |
|---|---|---|---|
| (6/36) | (5/37) | (6 + 5 * 19) / (36+37*19) = (101 / 739) | (1010 / 8400)*100 = 12.0 % |

FIG. 12

| First Slot in Super Frame (L+W/D) | Other Slot (L+W/D) | Per Super Frame (L+W/D) | Information & Wasted Load Ratio per Sec |
|---|---|---|---|
| (7/35) | (7/35) | (7 + 7 * 19) / (35+35*19) = (140 / 700) | (1400 / 8400)*100 = 16.6% |

FIG. 14

| First Slot in Super Frame (L+W/D) | First Slot in Frame (L+W/D) | Other Slots | Per Super Frame (L+W/D) | Information & Wasted Load Ratio per Sec |
|---|---|---|---|---|
| (6/36) | (5/37) | (3/39) | (6 + 5 * 4 + 3 * 15) / (36 + 37 * 4 + 39 *15) = (71 / 769) | (710 / 8400) = 8.45% |

FIG. 15

| First Slot in Super Frame (L+W/D) | Other Slot (L+W/D) | Per Super Frame (L+W/D) | Information & Wasted Load Ratio per Sec |
|---|---|---|---|
| (7/35) | (1/41) | (7 * 5 + 1 * 15) / (35 * 5 + 41 * 15) = (50 / 790) | (500 / 8400)*100 = 5.91% |

DYNAMIC RESOURCE ALLOCATION METHOD BASED ON FREQUENCY REUSE PARTITIONING FOR OFMDA/FDD SYSTEM, AND FRAME TRANSMISSION METHOD THEREFOR

TECHNICAL FIELD

The present invention relates to a dynamic resource allocation method based on a frequency reuse partitioning method for an Orthogonal Frequency Division Multiple Access (OFDMA) system, and a frame transmission method therefor. More particularly, the invention relates to a dynamic resource allocation method based on OFDMA/Frequency Division Duplex (OFDMA/FDD) system for acquiring a multi-user diversity gain by allocating a good channel to each mobile station in consideration of fairness thereof based on channel circumstance feedbacked from each mobile station to which each base station services, and a frame transmission method for the dynamic resource allocation.

BACKGROUND ART

Due to recent high interest of the $4^{th}$ generation mobile communication system at home and abroad, developments of systems that satisfy the requirements thereof are being actively progressed. In particular, Orthogonal Frequency Division Multiplexing (OFDM) has been attracted by one of systems that are adapted to use in the $4^{th}$ mobile communication system because of high transmission efficiency and simple channel equalization.

As typical multiple access schemes based on OFDM, there are OFDM-Frequency Division Multiple Access (OFDM-FDMA), OFDM-Code Division Multiple Access (OFDM-CDMA) and OFDM-Time Division Multiple Access (OFDM-TDMA). Among them, the OFDM-FDMA scheme allocates a different subchannel every user; and therefore, no Multiple Access Interference (MAI) is issued in intra cell and the number of subchannels and modulation level can be effectively changed depending on a transmission rate required by each user and channel circumstance. Thus; this scheme is advantageous to adaptive loading. In addition, since the OFDM-FDMA scheme is suitable for use of a great number of subcarriers, it can be applied to wireless communication systems with cells of wide area having relatively large time delay spread. And also, the OFDM-FDMA has drawn attention as a multiple access scheme for the $4^{th}$ mobile communication system because it is suited to systems that support high vehicular speed.

Meanwhile, duplex schemes are largely classified into Frequency Division Duplex (FDD) and Time Division Duplex (TDD).

The FDD scheme allows an uplink and a downlink to use different frequency bands wherein an interval between the frequency bands is enough as large as interference therebetween is negligible. This FDD scheme is mainly employed in macro cells that must provide relatively high time delay spread and high vehicular speed.

The TDD scheme shares a same frequency band for an uplink and a downlink, which is distinguished by setting a different time. This scheme can support services with asymmetric data transmission rate by modifying the number of slots of uplink and downlink and doesn't need to do a separate channel estimation of uplink and downlink by reciprocity characteristic of channel. However, such a scheme needs a guard time owing to round trip time and is mainly utilized in cells such as micro cells or hot-spot due to power problem.

The $4^{th}$ mobile communication system is required to support high transmission rate and secure a variety of service qualities by using limited wireless resources. For this, there has been a need for developments of cell planning and resource allocation algorithms to increase cell capacity and efficiently allocate wireless resources to users.

On the other hand, new services are needed for mobility guarantee and high speed transmission under wireless environments. According to this need, technical development and standardization works for portable internet service of 2.3 GHz band and Mobile Broadband Wireless Access (MBWA) service are being progressed in the country.

As mentioned above, the OFDM scheme is one of the most spotlighted techniques due to the high transmission efficiency and simple channel equalization.

Meanwhile, the most important property, which decides the performance of an OFDM multiple access-based system in cellular environments where mobility is considered, is Frequency Reuse Factor (FRF). This FRF implies the number of frequency sets used per cluster of mobile phone cells. In mobile phone business, it is important to accommodate the maximum subscribers with limited allocation frequencies, which is indirectly meant by FRF. As property of wireless scheme itself, an increase of FRF is possible by dividing service area into cells, micro-cells, pico-cells, etc. and again subdividing antenna sectors within a same cell, and with technique such as smart antenna, except for its own improvement.

If FRF is set as "1," it may be most ideal in view of throughput of base station because it uses all wireless resources; but there May be serious performance degradation due to inter-cell interference caused by FRF "1."

To implement FRF "1" while solving the performance degradation problem by the inter-cell interference, there is developed a flash-OFDM system by the Flarion company. This flash-OFDM system employs a scheme that maximally prevents the performance degradation by the inter-cell interference with Low Density Parity Check (LDPC) channel code by using a frequency hopping scheme that changes subcarriers of OFDM with a constant pattern. In addition, there is a scheme that randomly punches subcarriers to decrease collision of themselves and their adjacent cells and so as to implement FRF "1."

In the systems that maintain FRF as "1", however, the performance degradation still exists at the boundary of cells where channel condition is poor due to the inter-cell interference by increase of traffic load. Accordingly, as method for securing the performance of user terminals in an area where channel condition is poor such as the boundary of cells, together with improvement of frequency efficiency, there is a frequency reuse partitioning scheme.

The frequency reuse partitioning scheme is one of effective methods capable of elevating the frequency efficiency.

FIG. 1 is a view of describing a general frequency reuse partitioning scheme.

Basic idea of the frequency reuse partitioning scheme is that cells 111 to 117 are divided into an inner cell 101 and an outer cell 102 based on the length between a base station and a user terminal or an intensity of pilot signal sent from the base station to the user terminal, and then different FRFs are applied to the inner cell 101 and the outer cell 102.

As may be seen from FIG. 1, if the user terminal exists in the outer cell 102 area, subchannels with FRF "7" are allocated to cells 111, 112, 113, 116; and if the user terminal is within the inner cell 101 area, subchannels with FRF "1" are assigned to cells 114, 115, 117.

As mentioned above, the reason the channels with different FRFs are allocated to the inner cell 101 and the outer cell 102 is because it may be an importance factor that restricts cell radius of cellular system for the following: in case of terminals near to a base station, channel state is good since power loss by path loss is less than that of terminals far from the base station, while, in case of terminals around the boundary of cells, performance degradation is occurred and data transmission rate is constrained due to serious affection by power loss by path loss and inter-cell interference.

Therefore, in use of the frequency reuse partitioning scheme, channels with low FRF are assigned to the user terminals 114, 115, 117 in the inner cell 101 area to secure a proper level of service quality since their channel state is generally good, thereby enlarging the capacity of cell. Meanwhile, channels with high FRF are allocated to the user terminals 111, 112, 113, 116 in the outer cell 102 area because their channel state is relatively poor so that a radius of cell can be expanded and thus the same level of service quality and data transfer rate as that of the terminals in the inner cell can be secured, in case of the user terminals located at the boundary of cells.

In addition, wireless resource allocation methods have been recently studied to effectively employ limited frequency resources while alleviating inter-cell interference.

If it is assumed that channel is stationary and channel response of user is accurately perceived by transmission end, it is known that a combined scheme of water filtering and adaptive modulation technique is optimal one. This water filtering technique has been mainly developed only in single-user systems or multi-user systems that support constant resource allocation: for example, a system using TDMA or FDMA allocates slots or frequency channels for a given time for each user and then applies an adaptive modulation technique for channels of each user.

In the multi-user OFDM scheme that adopts the adaptive modulation technique based on the constant resource allocation as described above, however, there is a drawback in that it cannot know optimal resource allocation that can be provided by actual system. The reason is because there are many unused channels when water filling algorithm is applied due to presence of subchannels that suffers from deep fading or subchannels to which high power cannot be given in view of frequency selective channel characteristic.

However, there may be an instance where channel appeared as deep fading to one user may not be appeared as deep fading to another user. Generally, if the number of users is increased, a probability that each of subchannels constituting OFDM is appeared as deep fading channel to all users is gradually decreased. In other words, a multi-user diversity gain can be acquired by bearing independent channel as the number of users is increased.

Consequently, there has been required a study of an improved scheme capable of enabling an optimal resource allocation by dynamically allocating relatively good channel to each user based on channel information of all users and then applying an adaptive modulation scheme using those channels.

DISCLOSURE

Technical Problem

It is, therefore, an object of the present invention to provide a dynamic resource allocation method that can expand a radius of cell by selecting a cell planning method that divides one cell into an inner cell and an outer cell based on frequency reuse portioning in a system such as OFDM/FDD system and increases the capacity of system by fairly and dynamically allocating subchannels to each mobile station in consideration of channel information feedbacked from each user, a frame transmission method for the dynamic resource allocation.

Further, the invention proposes a frame structure of downlink and uplink necessary for operation of the dynamic resource allocation method that presents a more substantial improvement of downlink throughput by quantitatively analyzing overhead occurred at the downlink and uplink. This dynamic resource allocation method employs only adaptive modulation and coding on a slot basis and both of Dynamic Channel Allocation (DCA) and adaptive modulation and coding on a frame basis no as to reduce overhead occurred.

The other objectives and advantages of the invention will be understood by the following description and will also be appreciated by the embodiments of the invention more clearly. Further, the objectives and advantages of the invention will readily be seen that they can be realized by the means and its combination specified in the claims.

Technical Solution

In accordance with an aspect of the present invention, there is provided a dynamic resource allocation method based on a frequency reuse partitioning, the method comprising the steps of: a) dividing a signal reception coverage into cells based on a frequency reuse partitioning method; b) acquiring a ratio of a summation of transmission rates that have been allocated to a user in a current position of a cell to a transmission rate requested by the user, and selecting a candidate user to receive a channel allocated thereto based on the ratio; c) acquiring distance information for the selected candidate user to receive the channel allocated thereto; and d) checking whether the selected candidate user is in an inner cell area or an outer cell area based on the acquired distance information, and if the candidate user is in the inner cell area, selecting a subchannel group among subchannel groups having a Frequency Reuse Factor (FRF) lower than a predetermined threshold value and allocating subcarriers of the selected subchannel group, or if the candidate user is in the outer cell area, selecting a subchannel group among subchannel groups having a FRF higher than the threshold value and allocating subcarriers of the selected subchannel group.

In accordance with another aspect of the present invention, there is provided a frame transmission method for dynamic resource allocation based on frequency reuse partitioning method in an Orthogonal Frequency Division Multiple access (OFDM) system, comprising the steps of: a) forming frames each of which includes a first number of slots, and forming superframes each of which includes a second number of frames; and b) transmitting channel information needed for dynamic channel allocation from a base station to a mobile station or vice versa on the basis of a slot, a frame or a superframe according to a change rate of a channel.

Advantageous Effects

The present invention can reduce outage probability while increasing sector throughput of downlink due to a multi-user diversity gain acquired by a dynamic resource allocation, even in consideration of extra overhead, in case where the invention is applied to OFDAM/FDD system.

DESCRIPTION OF DRAWINGS

The above and other objects and features of the present invention will become apparent from the following description of the preferred embodiments given in conjunction with the accompanying drawings, in which:

FIGS. 11 and 12 are views showing the amount of overall downlink and uplink overhead occurred when performing a dynamic resource allocation in accordance with an embodiment of the invention;

FIGS. 14 and 15 are views showing the amount of overall downlink and uplink overhead occurred when conducting a dynamic resource allocation in accordance with another embodiment of the invention.

BEST MODE FOR THE INVENTION

The above-mentioned objectives, features, and advantages will be more apparent by the following detailed description associated with the accompanying drawings; and based on this, the invention will be readily conceived by those skilled in the art to which the invention pertains. Further, in the following description, well-known arts will not be described in detail if it seems that they could obscure the invention in unnecessary detail. Hereinafter, a preferred embodiment of the present invention will be set forth in detail with reference to the accompanying drawings.

Figure 1:
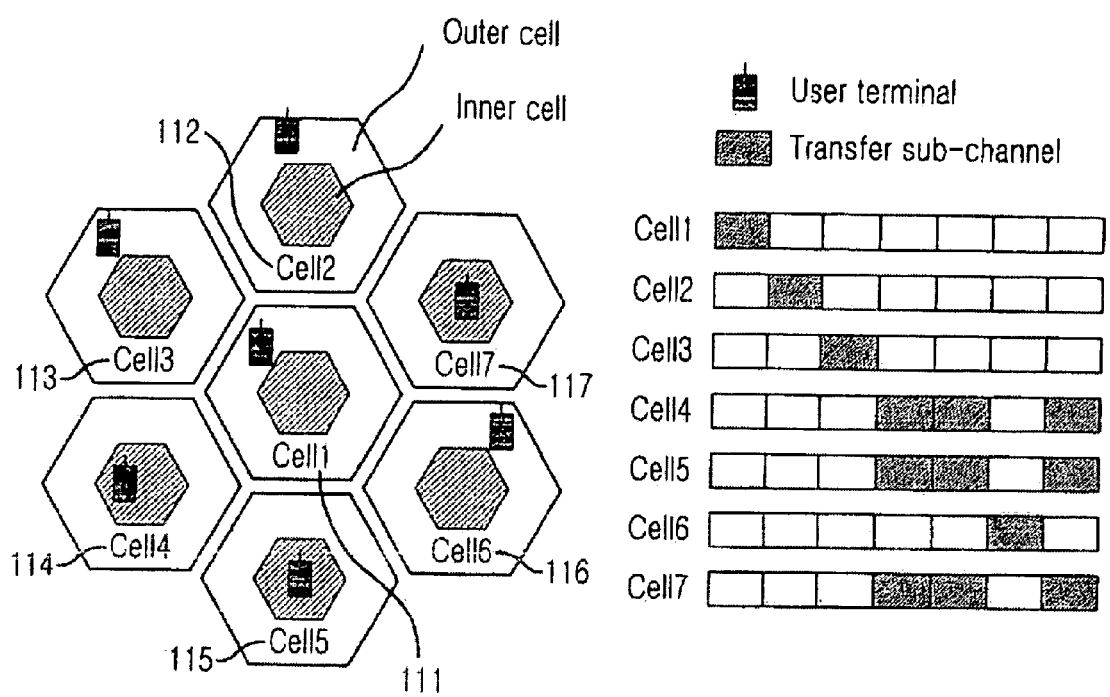
FIG. 1 is a view of describing a general frequency reuse partitioning method.
Figure 2:
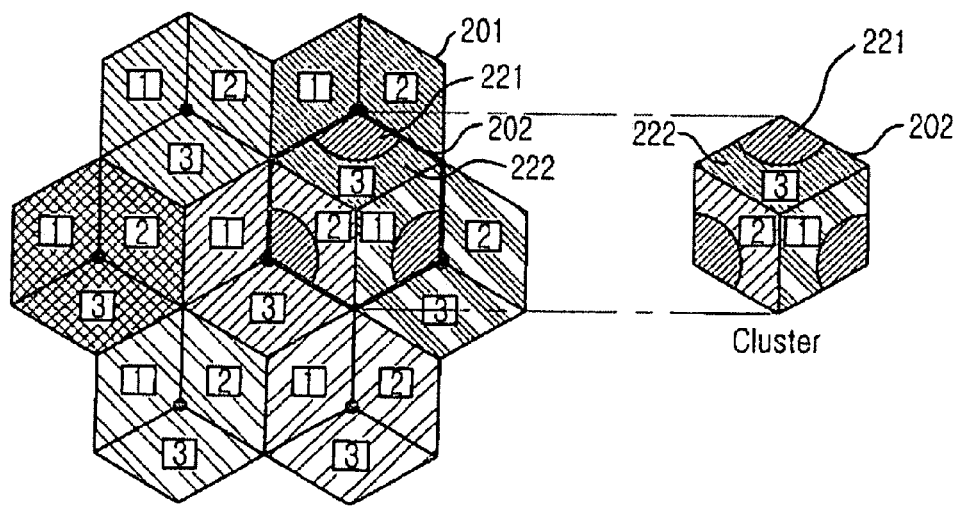
FIG. 2 is a view of describing a cell planning of a dynamic resource allocation method based on a frequency reuse partitioning scheme in accordance with an embodiment of the invention.

FIG. 2 is a view of describing a cell planning in a dynamic resource allocation method based on a frequency reuse partitioning scheme in accordance with an embodiment of the invention, wherein a basic cell panning for OFDMA/DCA platform is provided.

The cell planning of the dynamic resource allocation method based on the frequency reuse partitioning scheme in accordance with the invention takes account into a cell structure 201 of regular hexagon, each cell 201 being composed of three sectors 1, 2 and 3. Adopting the concept of the frequency reuse partitioning scheme into the sectors, each sector is divided into an inner cell area 221 and an outer cell area 222. And the overall network is divided into several clusters 202, each of which is composed of three sectors that are adjacent to one another while belonging to different three cells.

Figure 3:
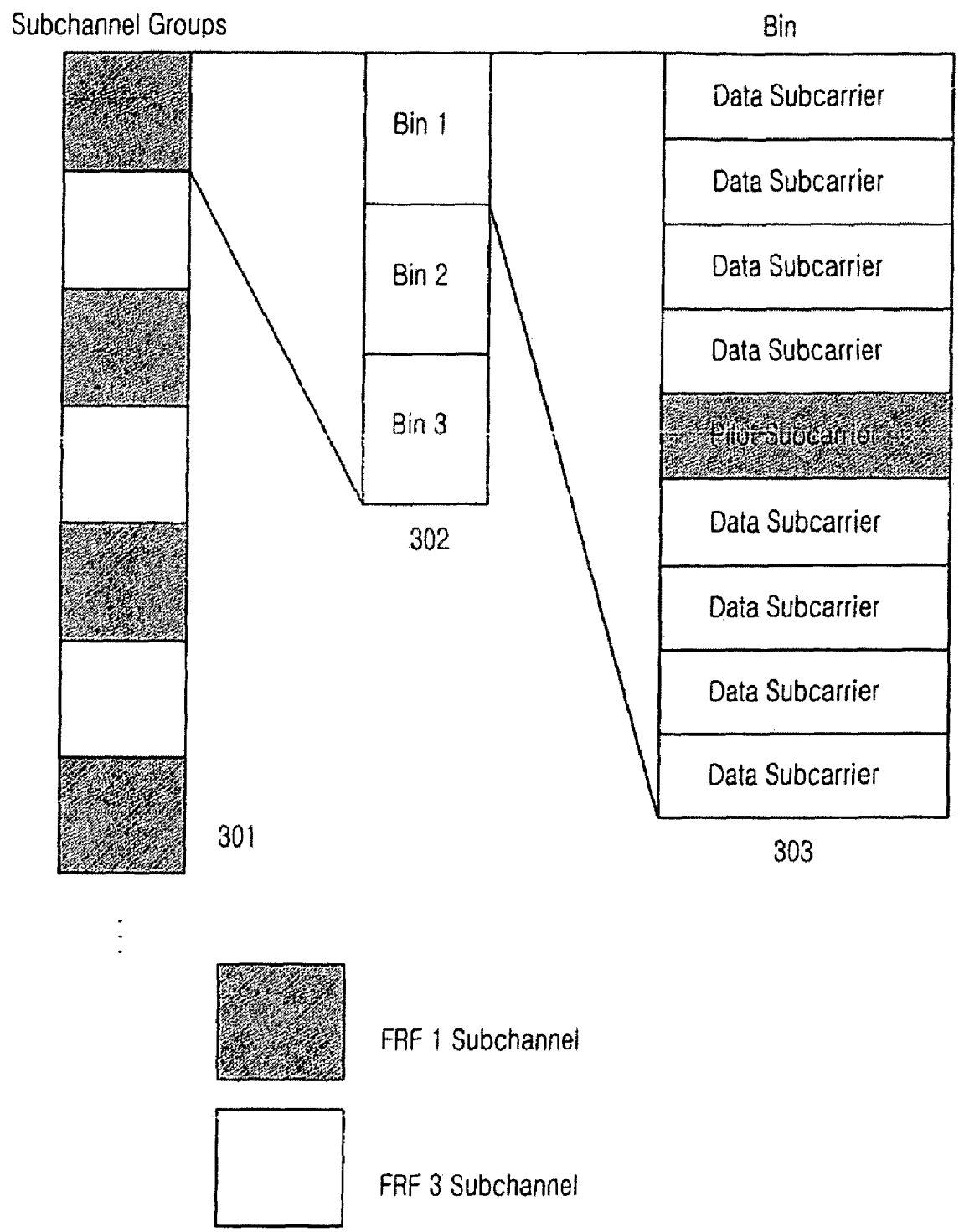
FIG. 3 is a view showing a structure of wireless resources that can be used in one cluster in a dynamic resource allocation method based on a frequency reuse partitioning scheme in accordance with an embodiment of the invention.

FIG. 3 is a view of describing a structure of wireless resources that can be used in one cluster in the dynamic resource allocation method based on the frequency reuse partitioning scheme in accordance with an embodiment of the invention.

As illustrated therein, it is assumed that an entire band is composed of 32 subchannel groups 301 in a frequency domain, each group having 27 subcarriers. And a set 303 of 9 consecutive subcarriers is defined as bin 302.

One of the 9 consecutive subcarriers 303 constituting the bin 302 indicates a pilot subcarrier that can be used as various usages such as channel estimation, Signal to Interference plus Ration (SINR) measurement, etc. Further, it is assumed that a transmission power of each Subcarrier is fixed. The 32 subchannel groups 301 can use different FRFs, in which one of two values "1" and "3" can be utilized as FRF. If FRF of any of the subchannel groups 301 is "1," three sectors in its cluster can use all the subcarriers of that group. And if FRF of any of the subchannel groups is "3," only any one of the three bins constituting the group is distributed to the three sectors forming the cluster.

An average SINR value for all the groups is feedbacked from a user to a sector to which he/she belongs during one super frame.

Each sector allocates a channel of a group with good SINR to a user based on the feedback information and thus can acquire a multi-user diversity gain.

Basic scheme of the dynamic channel allocation method in accordance with the invention are as follows.

There are two considerations below to allocate a channel to a user. The first consideration is a ratio SIR of a sum of transfer rates assigned to the user up to date to a transfer rate required by the user. Namely, the dynamic channel allocation method preferentially allocates a channel to a user with the lowest ratio out of the ratios that divide a sum of transfer rates assigned to the user up to date by a transfer rate required by the user.

The second consideration is whether the user is within the inner cell area or within the outer cell area.

The basic scheme of the frequency reuse partitioning is that a channel with low FRF is allocated to a terminal near to a base station, while a channel with high FRF is allocated to a terminal far from a base station. Therefore, by applying this scheme to the dynamic channel allocation method, it is designed that subcarriers 303 of good subchannel group 301 with high SINR are dynamically assigned from subchannel groups with FRF "1" to a terminal near to the base station while allocating from subchannel groups with FRF "3" to a terminal far from the base station based on channel circumstance of the user.

Figure 4:
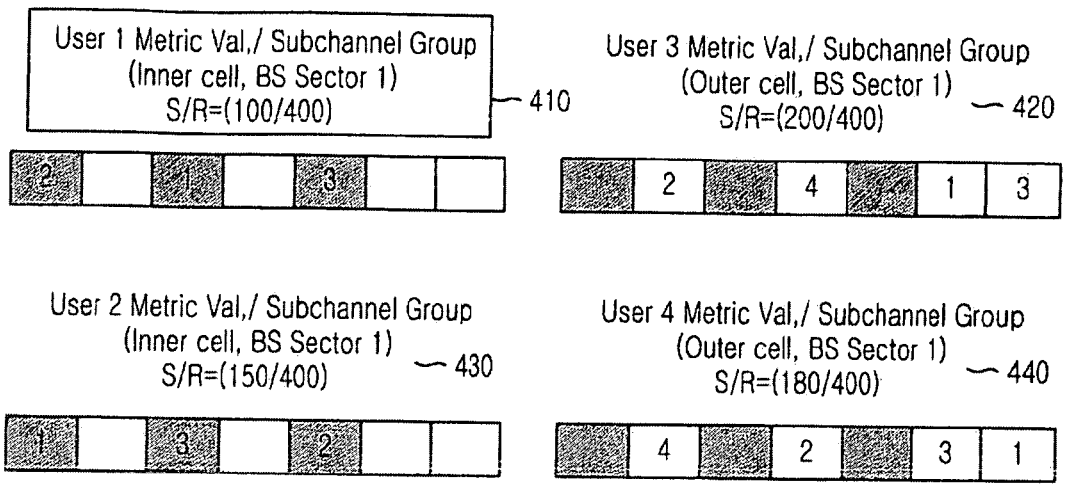
FIG. 4 is a view for explaining a channel allocation method of a dynamic resource allocation method based on a frequency reuse partitioning scheme in accordance with an embodiment of the invention.

FIG. 4 is a view for explaining a channel allocation method in the dynamic resource allocation method based on the frequency reuse partitioning in accordance with an embodiment of the invention.

From FIG. 4, it may be found that a user with the lowest S/R among ratios of the sum of the transmission rates assigned until now to the transmission rate required by the user is the user "1" 410 who is decided as channel allocation candidate.

Figure 5:
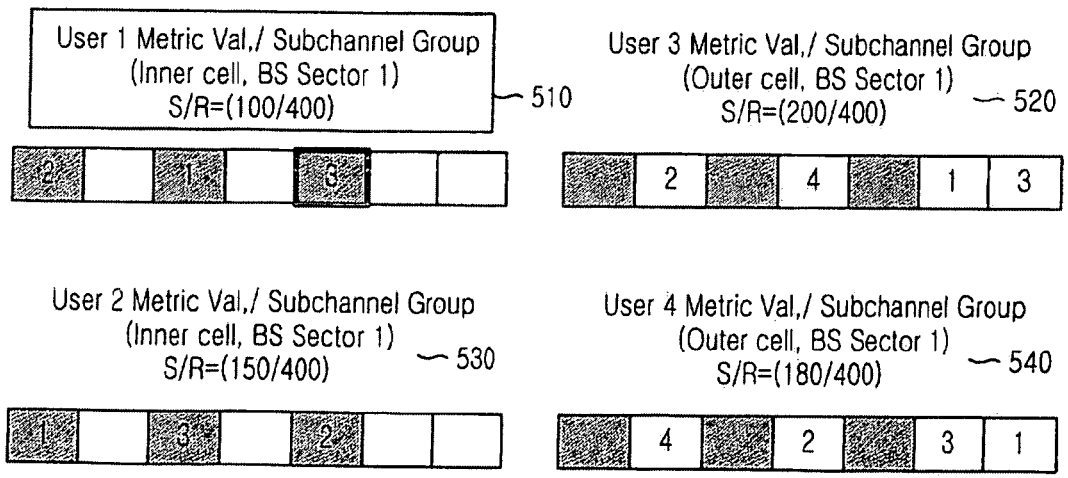
FIG. 5 is a view for explaining a channel allocation method of a dynamic resource allocation method based on a frequency reuse partitioning scheme in accordance with another embodiment of the invention.

FIG. 5 is a view for explaining a channel allocation method in the dynamic resource allocation method based on the frequency reuse partitioning in accordance with another embodiment of the invention.

In FIG. 5, a subchannel group with the best characteristic is decided from subchannel groups with FRF "1" and subcarriers therein are allocated to users within the inner cell based on the channel information and length information of the user "1" 510. And a subchannel group with the best characteristic is decided from subchannel groups with FRF "3" and subcarriers therein are allocated to users within the outer cell based thereon.

In other words, the channel allocation method allocates channels to the users by repeating the processes of applying the ratio S/R and the length information of the users.

Figure 6:
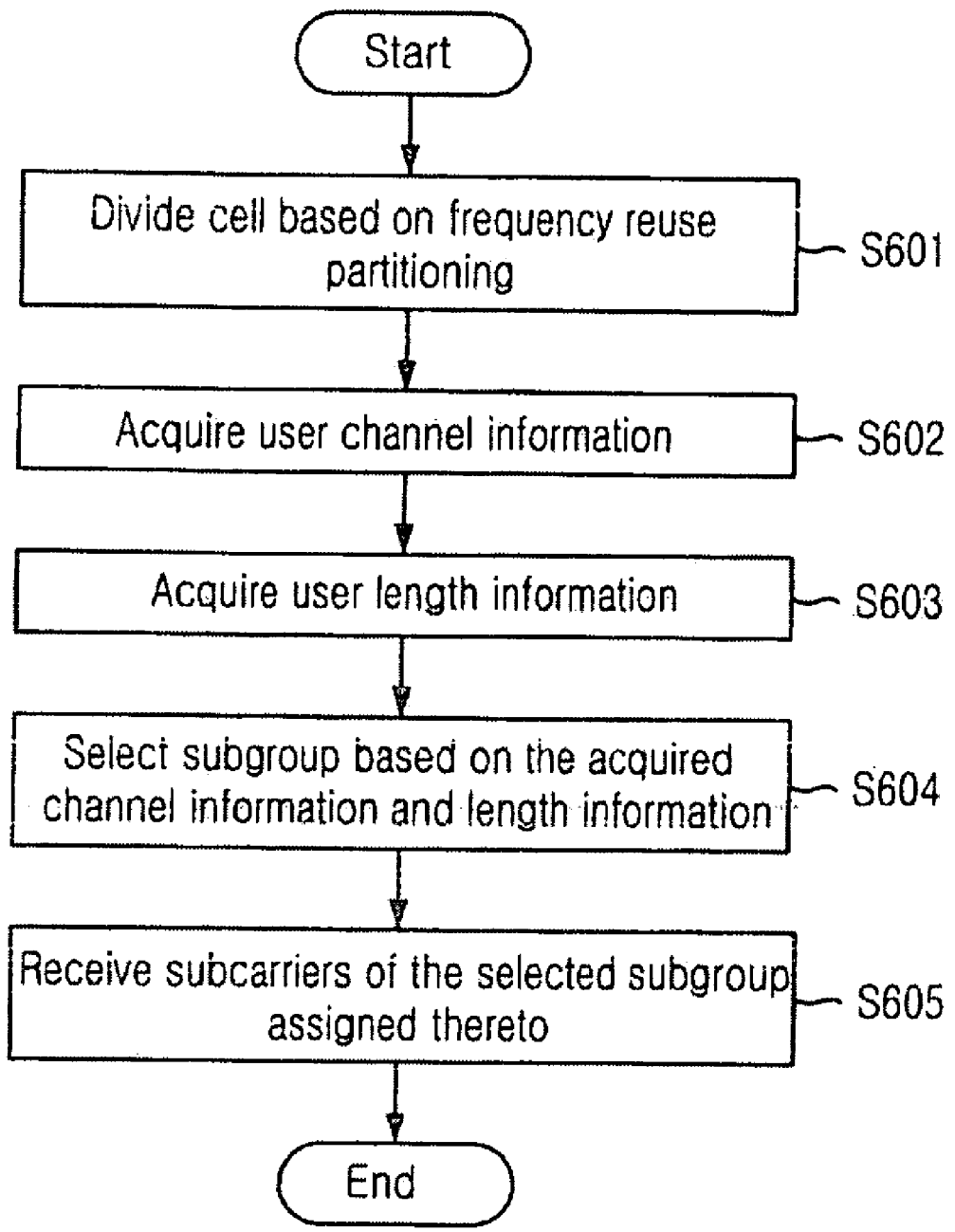
FIG. 6 is a flowchart for explaining a dynamic resource allocation method based on a frequency reuse partitioning scheme in accordance with an embodiment of the invention.

FIG. 6 shows a flowchart for explaining a dynamic resource allocation method based on the frequency reuse partitioning in accordance with an embodiment of the invention.

At step S601, cells are divided based on the frequency reuse partitioning. At step S602, a candidate user to receive a channel allocated thereto is determined based on a ratio of a summation of transmission rates that have been allocated to the user positioned at a current position of a cell up until the moment to a transmission rate requested by the user.

Subsequently, at step S603, distance information for the determined candidate user for channel allocation is acquired. At step S604, it is checked whether the candidate user to receive the current channel allocated thereto is in an inner cell area or an outer cell area, and if the candidate user is in the inner cell area, a subchannel group having the best characteristic is selected from subchannel groups having an FRF of "1," and subcarriers of the selected subchannel group are allocated to the candidate user. Otherwise, if the candidate user is in the outer cell area, a subchannel group having the best characteristic is selected from subchannel groups having an FRF of "3," and subcarriers of the selected subchannel group are allocated to the candidate user at the S605.

Figures 7, 8:
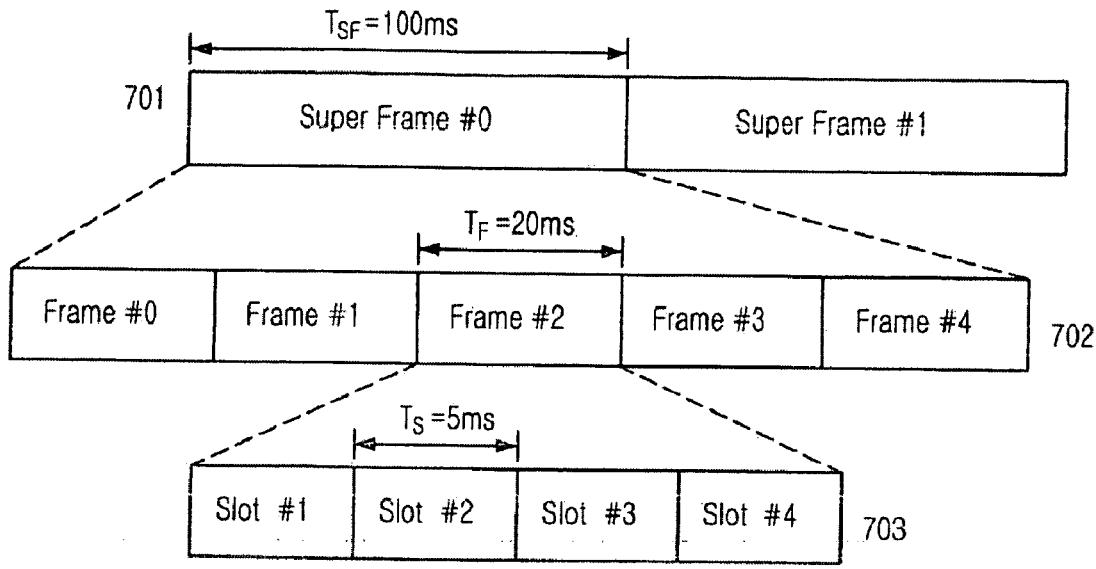
FIG. 7 is a view showing a structure of downlink frame for OFDMA/DCA platform in accordance with an embodiment of the invention.
FIG. 8 is a view showing basic parameters of a target system in a dynamic resource allocation method based on a frequency reuse partitioning Scheme in accordance with an embodiment of the invention.

FIG. 7 is a view showing a structure of downlink frame for OFDMA/DCA platform in accordance with an embodiment of the invention.

As shown therein, a super frame 701 is composed of 5 frames 702, each of which has 4 slots 703 of 5 ms unit. In short, a frame is formed to include four slots and a super frame is formed to include 5 frames.

The channel information necessary for execution of DCA may be transferred from a mobile station to a base station or vice versa on the basis of a slot 703, a frame 702, or a super frame 701, depending on change speeds of channel.

A target system should be specified to compute overhead required for dynamic resource allocation.

FIG. 8 is a view showing basic parameters of a target system in the dynamic resource allocation method based on the frequency reuse partitioning in accordance with an embodiment of the invention.

As shown in FIG. 8, the basic parameters of the target system of the present invention include the number of subcarriers 801, the number of effective subcarriers 802, the number of pilot subcarriers 803, sampling frequency 804, the number of subchannel groups 805, the number of subcarriers per subchannel group 806, the number of subchannel groups with FRF "1" 807, and the number of subchannel groups with FRF "3".

The dynamic resource allocation is conducted every slot to compute the amount of overhead therefor; and therefore, the mobile station feedbacks channel information for all the groups to the base station by slot unit and the base station provides the mobile station with location information of subcarriers newly assigned based on the channel information by slot unit. Further, the location information of the mobile station is transmitted once per super frame. Then, the overhead to be transmitted from the base station for the dynamic resource allocation may be classified into three as follows.

The overhead is firstly position information of super frame unit, secondly OFDM preamble provided from the base station per slot for Carrier to interference and Noise Ratio (CINR) measurement of all subchannel groups at the mobile station, and thirdly allocation information of subcarriers assigned to the mobile station from the base station per slot.

Figure 9:
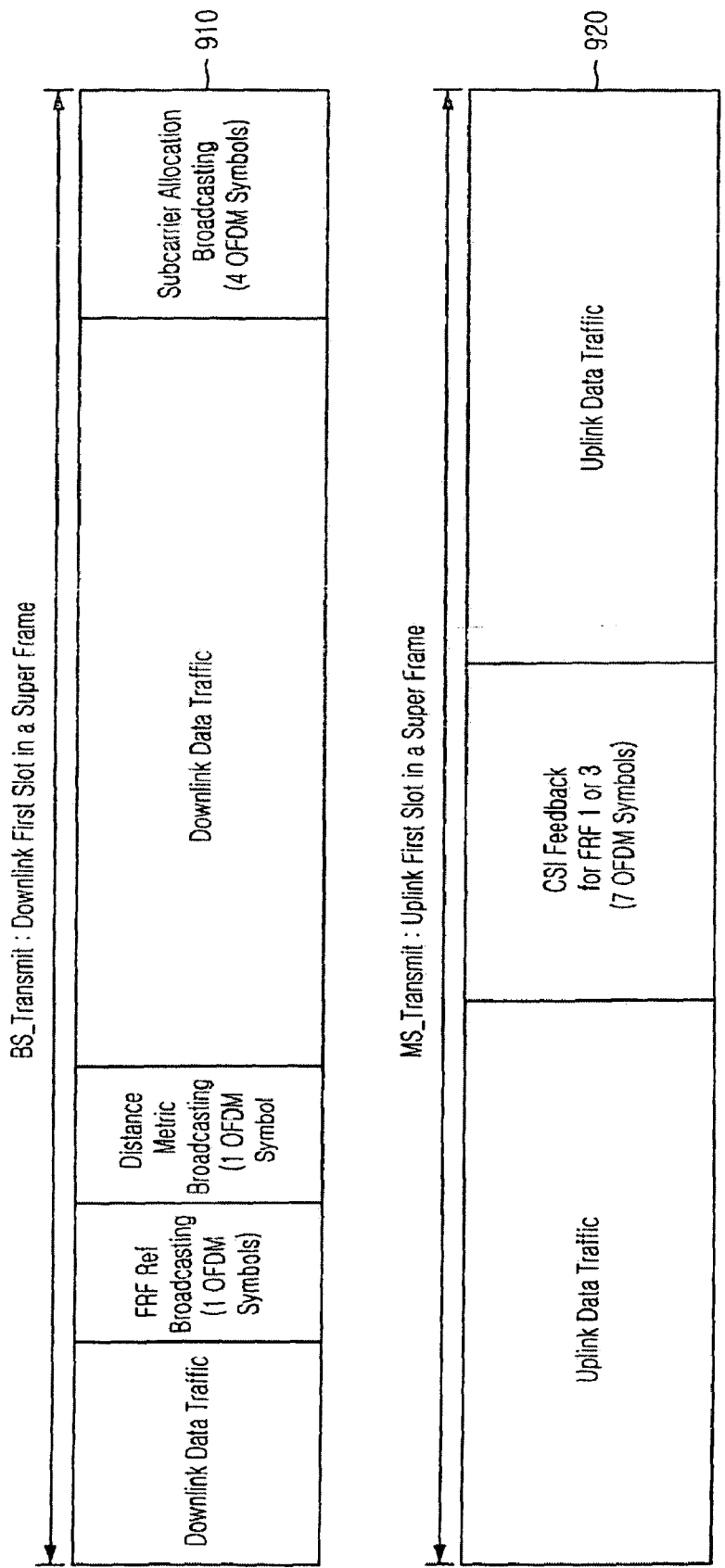
FIG. 9 is a view showing a structure of each of an uplink slot and a downlink slot in accordance with an embodiment of the invention.

FIG. 9 is a view showing a structure of each of uplink and downlink slots, especially of each of a first uplink slot and a first downlink slot at the beginning of a super frame in accordance with an embodiment of the invention.

First, there is shown a structure of a first downlink slot 910 at the beginning of the super frame.

The first downlink slot 910 of a super frame includes downlink data traffic, fields 911 and 914, an FRF reference broadcasting field 912, a distance metric broadcasting field 913, and a subcarrier allocation broadcasting field 915.

The subcarrier allocation broadcasting field 915 also includes one preamble to measure CINR of all the subchannel groups at the mobile station in every slot, and the distance metric broadcasting field 913 one OFDM symbol to transmit location information of the mobile station on a super frame basis at each sector.

The FRF reference broadcasting field 912 includes information on whether the mobile station is in the inner cell area or outer cell area, it is an important factor for deciding whether the mobile station will perform the dynamic resource allocation in subchannel group with FRF "1" or in subchannel group with FRF "3."

If the mobile station is within the inner cell area, "0" is indicated, while if it is within the outer cell area, "1" is indicated. In this case, in case where the location information of mobile stations is sent to subcarriers allocated to each mobile station, the location information can be sent to each mobile station as one OFDM symbol without extra coding. Further, 4 OFDM symbols at the rear part of the slot are sent from the subcarrier allocation broadcasting field 915 for reallocation of subcarriers using the channel information of the mobile stations and adaptation modulation.

Meanwhile, the subcarrier allocation broadcasting field 915 including the 4 OFDM symbols are used for the following reasons.

It is first assumed that the maximum number of users that can be supported at one sector is 64 to compute the amount of subcarrier allocation information assigned to the mobile station from the base station on the basis of the channel information sent from the mobiles station to the base station. Also it is assumed that the mobile station requires low mobility and high data rate and the base station allocates 9 consecutive subcarriers at a time when the base station distributes its subcarriers to each mobile station based on the channel information of each mobile station. Then, in case of a sector having 16 channel groups with FRF "1" and 16 channel groups with FRF "3," there are 64 users on a basis of 9 consecutive subcarriers unit (16×3+16=64). Therefore, each sector can allocate 64 sets of 9 consecutive subcarriers to the mobile stations. Accordingly, it needs 6 bits to identify 64 users and thus needs total "6×64=384 bits" for 64 users. Further, when channel coding of "½ turbo+4 repetition" is considered, total "384×2×4=3072 bits" are needed. And also, when modulation of Quadrature Phase Shift Keying (QPSK) is taken, overhead of downlink necessary for transmission of subcarrier allocation information for DCA is "3072/(768×2)=2 OFDM symbols."

Therefore, the downlink overhead necessary for DCA every slot is total 3 OFDM symbols that are a sum of 1 OFDM preamble for CINR measurement and 2 OFDM symbols for subcarrier allocation information.

When user has low mobility, Adaptive Modulation and Coding (AMC) as well as DCA can be used together. If it is assumed that there are 9 selectable AMC modes, AMC is possible by bin unit composed of 9 consecutive subcarriers and AMC is applied every slot, 4 bits are needed indicate each of the 9 AMC modes. And if "½ turbo+4 repetition" and QPSK as AMC are considered, additionally necessary data amount is "(4×64×2×4)/(768×2)<2 OFDM symbols". Thus, the data amount for subcarrier reallocation and adaptive modulation by the channel information of the mobile station becomes 4 OFDM symbols.

Hereinafter, a structure of the first uplink slot 920 at the beginning part of the super frame will be described.

The first uplink slot 920 at the beginning part of the super frame includes uplink data traffic fields 921 and 923 and a CSI feedback field 922 for FRF 1 or 3.

The overhead amount of the uplink necessary for DCA is as follows.

First, it is determined whether the mobile station of a user is in the inner cell area or in the outer cell area based on the OFDM preamble for CINR measurement, which is transmitted through a downlink. When the mobile station is in the inner cell area, measured CINR values for subchannel groups with FRF "1" among the entire subchannel groups are transmitted through the CSI feedback field 922 for RFR 1 or 3. Otherwise, when it is in the outer cell area, the measured CINR values for subchannel groups with FRF "3" are transmitted through the CSI feedback field 922 for RFR 1 or 3.

It is first assumed that 24 effective subcarriers are allocated to the mobile station for the uplink to calculate the overhead value thereof.

Next, when it is assumed that the mobile station is within the inner cell area, the mobile station must transmit CINR values for 16 subchannel groups assigned as FRF "1" to the base station. When CINR values are divided into 32 and thus represented with 5 bits, the amount of information to be sent from the mobile station to the base station is "16×5=80 bits." Further, when channel coding of "½ turbo+2 repetition" and QPSK are considered, the number of actually necessary OFDM symbols is "(80×2×2)/(24×2)<7 OFDM symbols".

Figure 10:
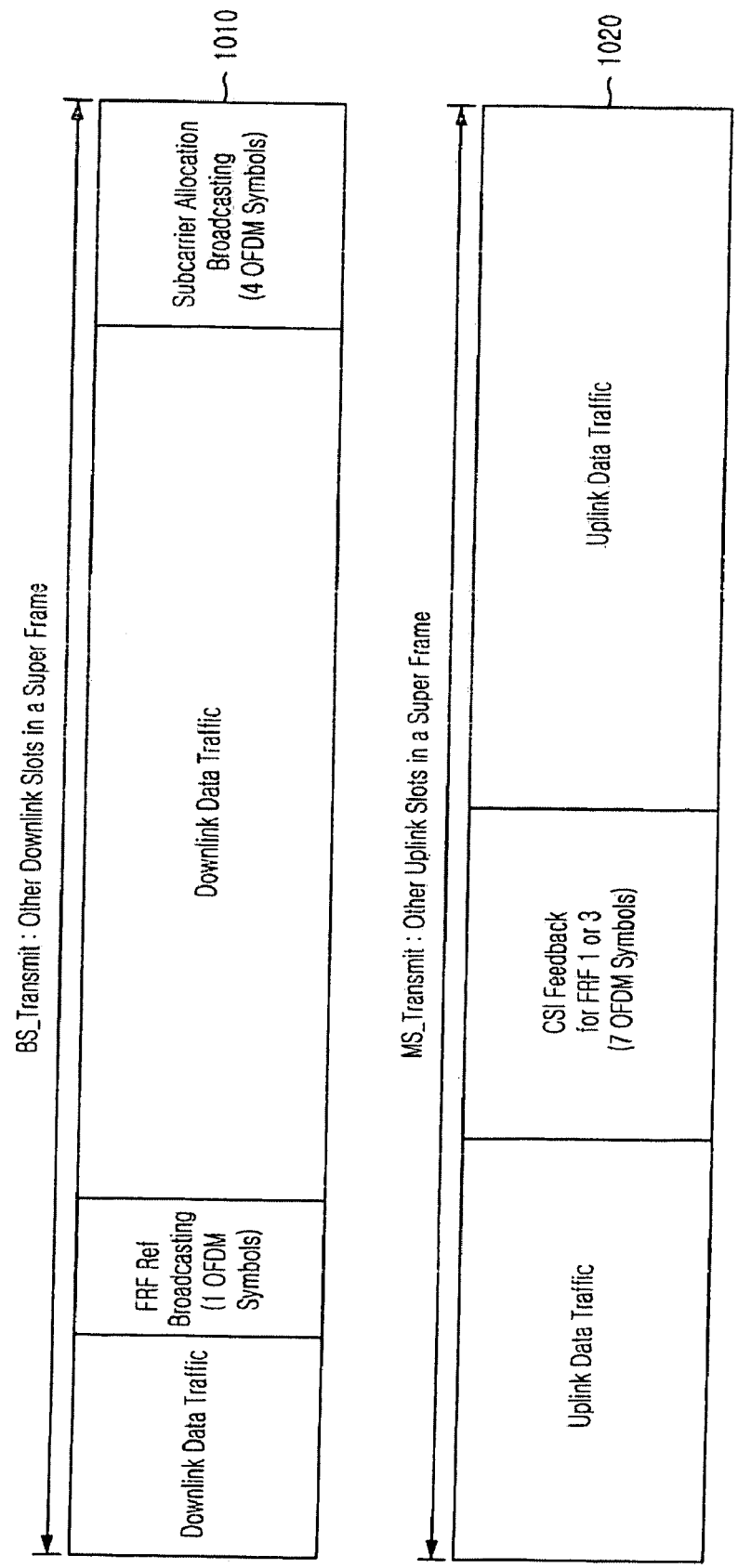
FIG. 10 is a view showing a slot structure of each of an uplink super frame and a downlink super frame in accordance with another embodiment of the invention.

FIG. 10 is a view showing slot structures of uplink and downlink super frames in accordance with another embodiment of the present invention. It shows uplink and downlink slots excluding the slot in the beginning part of a super frame.

In case of the uplink slot, a structure of the slot 920 at the start of the super frame is identical to a structure 1020 of slots excluding the start slot; and in case of the downlink slot, a structure 1010 of slots excluding the first slot of the super frame does not have an OFDM symbol for the distance metric broadcasting field 913 which informs location information of the mobile station, differently from the structure of the slot 920 at the start of the super frame.

FIGS. 11 and 12 are views showing the amount of overall downlink and uplink overhead occurred when doing the dynamic resource allocation method in accordance with an embodiment of the invention.

It may be found that the overhead to be provided from the mobile station and the base station has a considerably large amount to perform the dynamic resource allocation every slot. Therefore, alternatively, another method for decreasing the overhead caused due to the dynamic resource allocation conducts the dynamic resource allocation once every frame while doing adaptive modulation every slot, without doing them together each time.

Figure 13:
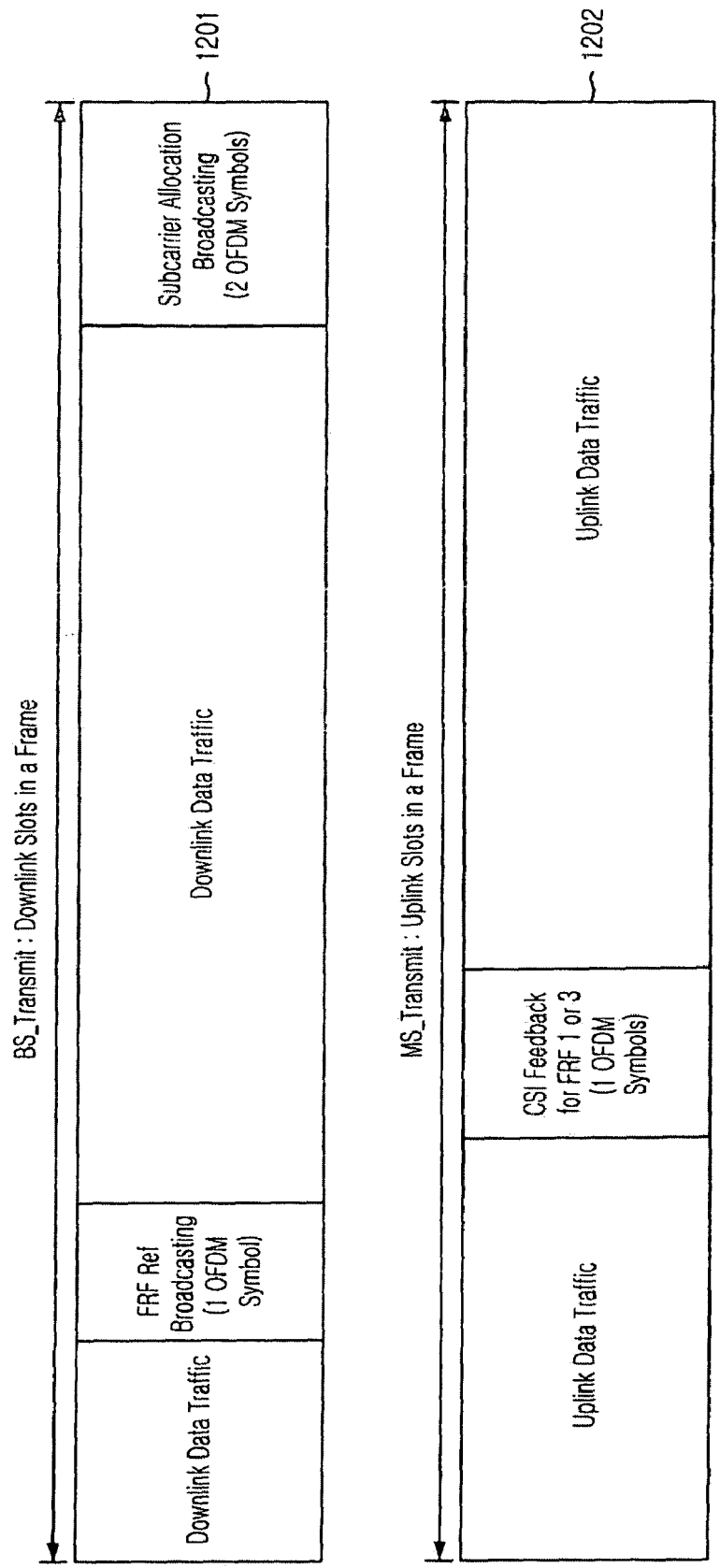
FIG. 13 is a view showing a slot structure of each of an uplink frame and a downlink frame in accordance with an embodiment of the invention.

FIG. 13 is a view showing slot structures of uplink and downlink frames in accordance with an embodiment of the invention.

In case where the dynamic resource allocation is conducted once per frame while doing adaptive modulation every slot, without doing them together each time, to decrease the overhead due to its conduction, it is represented as a downlink slot 1201 and an uplink slot 1202 that performs the adaptive modulation only. Since the adaptive modulation and the dynamic resource allocation are simultaneously performed with respect to a first slot at the start of each frame, the slot structure has the same structure as the slot structure 1010 excluding the start slot of super frame at the downlink of FIG. 10 and the slot structure 1020 excepting the start slot of super frame at the uplink thereof. Since the adaptive modulation and the dynamic resource allocation are simultaneously performed with respect to a slot at the start of each super frame and location information of each user is transmitted, the slot structure has the same structure as the slot structures 910 and 920 at the start of the super frames in the downlink and the uplink.

FIGS. 14 and 15 are views showing the amount of overall downlink and uplink overhead occurred when doing the dynamic resource allocation in accordance with another embodiment of the invention.

The overall downlink overhead is decreased as shown in FIG. 14. From the fact that, in case of doing adaptive modulation only per slot, the overhead is "3/42*100=7.1%", it may be seen that about 1.35% of additional overhead is needed to apply the dynamic resource allocation.

Meanwhile, the overhead of uplink is only 1 OFDM symbol since only CINR for subchannels assigned to the uplink itself is sent per slot; and CINR values for the overall subchannel groups are sent for the dynamic resource allocation once per frame.

FIG. 15 shows an overhead of uplink in which a great amount of uplink overhead can be reduced by conducting only the adaptive modulation per slot while doing the dynamic resource allocation per frame, without doing them together per slot.

The present invention provides a dynamic resource allocation method that can expand a radius of cell by selecting a cell planning that divides one cell into an inner cell and an outer cell based on a frequency reuse portioning for OFDM/FDD system, and increases the capacity of system by dynamically and fairly allocating subchannels to each mobile station in consideration of channel information feedbacked from each user.

When the present invention is applied to the OFDMA/FDD system, it can decrease outage probability while increasing a downlink sector throughput due to multi-user diversity gain obtained from the dynamic resource allocation even though additional overhead is taken into consideration.

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

The present application contains subject matter related to Korean patent application Nos. 2005-0076466 and 2005-0118386, filed with the Korean Intellectual Property Office on Aug. 19, 2005, and Dec. 6, 2005, respectively, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A dynamic resource allocation method based on a frequency reuse partitioning, the method comprising the steps of:
   a) dividing a signal reception coverage into cells based on a frequency reuse partitioning method;
   b) acquiring a ratio of a summation of transmission rates that have been allocated to a user in a current position of a cell to a transmission rate requested by the user, and selecting a candidate user to receive a channel allocated thereto based on the ratio;
   c) acquiring distance information for the selected candidate user to receive the channel allocated thereto; and
   d) checking whether the selected candidate user is in an inner cell area or an outer cell area based on the acquired distance information, and if the candidate user is in the inner cell area, selecting a subchannel group among subchannel groups having a Frequency Reuse Factor (FRF) lower than a predetermined threshold value and allocating subcarriers of the selected subchannel group, or if the candidate user is in the outer cell area, selecting a subchannel group among subchannel groups having a FRF higher than the threshold value and allocating subcarriers of the selected subchannel group.

2. The method as recited in claim 1, wherein each cell is divided into three sectors, and each sector is divided into an inner cell area and an outer cell area in the step a) based on the frequency reuse partitioning, and an entire network is divided into a predetermined number of clusters, each of which is composed of three sectors of different cells adjacent to each other.

3. The method as recited in claim 1, wherein the subchannel groups obtained by dividing an entire band into a predetermined number of subchannel groups in a frequency domain, and each subchannel group is a set of bins, each of which is a set of consecutive multiple subcarriers and used for channel estimation and signal-to-interference plus noise ratio (SINR) measurement.

4. The method as recited in claim 1, wherein a channel is allocated with priority to a user having a smallest ratio of a summation of transmission rates that have been allocated to the user at a current position to a transmission ratio requested by the user in the step b).

* * * * *